United States Patent
Antos et al.

[11] Patent Number: 6,128,928
[45] Date of Patent: Oct. 10, 2000

[54] OPTICAL FIBER RESISTANT TO HYDROGEN-INDUCED ATTENUATION

[75] Inventors: A. Joseph Antos, Elmira, N.Y.; Timothy L. Hunt, Wilmington, N.C.; Dale R. Powers, Painted Post, N.Y.; William A. Whedon, Wilmington, N.C.

[73] Assignee: Corning Incorporated, Corning, N.Y.

[21] Appl. No.: 09/021,512

[22] Filed: Feb. 10, 1998

Related U.S. Application Data

[62] Division of application No. 08/728,713, Oct. 11, 1996, Pat. No. 5,838,866.
[60] Provisional application No. 60/006,217, Nov. 3, 1995.
[51] Int. Cl.⁷ .................. C03B 37/075; C03B 37/018; C03B 6/00; C03B 6/18; C03C 13/00
[52] U.S. Cl. .................. 65/398; 65/399; 65/421; 65/422; 65/426
[58] Field of Search ............... 65/398, 426, 421, 65/422, 399

[56] References Cited

U.S. PATENT DOCUMENTS

| | | | |
|---|---|---|---|
| 4,529,426 | 7/1985 | Pleibel et al. | 65/412 |
| 4,735,475 | 4/1988 | Watanabe et al. | 350/96.34 |
| 5,220,628 | 6/1993 | Delbare et al. | 385/14 |
| 5,596,668 | 1/1997 | DiGiovanni et al. | 385/123 |
| 5,681,365 | 10/1997 | Gilliland et al. | 65/377 |
| 5,838,866 | 11/1998 | Antos et al. | 385/127 |

FOREIGN PATENT DOCUMENTS

| | | |
|---|---|---|
| 60-50503 | 3/1985 | Japan . |
| 61-9605 | 1/1986 | Japan . |
| 61-158304 | 7/1986 | Japan . |
| 1-102507 | 4/1989 | Japan . |

*Primary Examiner*—Stanley S. Silverman
*Assistant Examiner*—Jacqueline A. Ruller
*Attorney, Agent, or Firm*—Scott S. Servilla; Timothy R. Krogh

[57] ABSTRACT

Improved single-mode optical waveguide fibers having a central core region, surrounded by an inner cladding region through which light at a chosen signal wavelength will propagate to an appreciable degree along with propagation of same in the central core region, the inner core region further surrounded by an outer cladding region, the improvement comprising germanium dioxide in the inner cladding region at a concentration within the range of about 0.005 percent by weight to about 1 percent by weight of said inner cladding region, effective to significantly reduce the concentration of oxygen atoms in the inner cladding region which are available to form defects that cause hydrogen-induced attenuation. Also provided are core preforms, overclad preforms, and processes for making the fibers, core preforms and overclad preforms.

13 Claims, 3 Drawing Sheets

OPTICAL FIBER RESISTANT TO HYDROGEN-INDUCED ATTENUATION

This is a division of application Ser. No. 08/728,713, filed Oct. 11, 1996 now U.S. Pat. No. 5,838,866, which claims priorty of U.S. Provisional Application Ser. No. 60/006,217 filed on Nov. 3, 1995.

BACKGROUND

This invention relates in general to optical fibers, and, in particular, to an optical fiber that resists attenuation caused by hydrogen and methods of making it.

The low attenuation and dispersion characteristics of optical fibers are advantageously employed to form long repeaterless links, although there is a certain amount of attenuation present in any fiber. Such attenuation ultimately requires reamplification of the light carried by the fiber. In certain circumstances it is desired to use a large percentage of the loss budget made available by the low loss (attenuation) of fiber by using long repeaterless fiber links, thereby providing very little safety factor. If after the fiber is placed in service, attenuation in the fiber significantly increases at the transmitting wavelength system operation can be interrupted.

Studies have found that attenuation of installed fibers is caused, in part, by hydrogen entering the fiber, especially the core. There are several known hydrogen induced attenuation effects: (1) interstitial hydrogen, which is directly proportional to the partial pressure of hydrogen in the ambient atmosphere, and is reversible; (2) increases in phosphorus hydroxyl absorption (1300–2000 nm) which precludes the use of $P_2O_5$ as a dopant, except in low (less than 0.1 wt. %) concentration; (3) under high temperature-long term $H_2$ exposure, there results a high optical absorption at short wavelengths that has an extensive tail extending through the visible and into the infrared region; (4) transient absorption that occurs when $H_2$ first arrives in the fiber core region with most notably peaks at 1330, 1440, and 1530 nm; and permanent absorption that occurs due to Si—O—O—H—H at 1380 nm.

Others have made attempts to mitigate the hydrogen attenuation problem. See, for example, Blankenship U.S. Pat. No. 5,059,229, assigned to Corning Incorporated which describes a process for post-treating a fiber by exposure to hydrogen to reach a stable, albeit elevated attenuation level; and demonstrating no further increased attenuation when the fiber is subsequently exposed to a hydrogen containing atmosphere after being placed in service. Despite this symptomatic treatment and other efforts, the problem of hydrogen-induced attenuation persists.

One principal cause of light attenuation in optical fibers is hydroxyl groups, which produce a very strong optical absorption peak near 1380 nm. Much work has been done as evidenced by the published literature in an effort to reduce the presence of such species. It is conventionally known, for example, to dry a porous glass soot preform during consolidation in the presence of chlorine, which reacts with water present in the glass to form hydrogen chloride gas which is then simultaneously removed from the preform at high temperatures, thus reducing the concentration of hydroxyl ions in the glass.

Even granting such measures, other sources of attenuation persist. In formation of silica glasses (particularly during consolidation of the core preform and during fiber draw), peroxyl linkages (—Si—O—O—Si—) may occur, because excess oxygen becomes trapped within the glass. These peroxyl linkages can decompose, yielding reactive —Si—O—O— sites. If hydrogen subsequently enters the glass, it can react with the —Si—O—O—species, forming Si—O—O—H—H species which absorb at 1530 nm and could therefore adversely affect operation at 1550 nm. The Si—O—O—H—H species subsequently lose a hydrogen atom and form Si—O—O—$H_2$ which absorbs at 1380 nm. Additionally, Si—Si defects may occur. These can decompose to Si—Si— radicals, and excess oxygen can react with them to form Si—O—O radicals. We also suspect that germanium may incorporate itself into the Si—Si defects.

We have now found that germanium dioxide can control the attenuation-increasing effects of hydrogen migration into the light-carrying regions of an optical fiber, by scavenging excess oxygen which would otherwise form reactive species, thereby preventing the reaction of such oxygen with migrating hydrogen to form hydroxyl groups. The germanium is introduced into the soot deposition flame in reactive form, e.g., germanium tetrachloride. Upon burning of the reactants including germanium tetrachloride to produce glass soot during preform lay down the germanium tetrachloride will react with oxygen to form germanium dioxide. Germanium dioxide deposited by the flame deposition process is not a stoichiometric compound because it contains fewer than 2 oxygen atoms for each germanium atom. Hence, the germanium "dioxide" can scavenge excess oxygen from the preform glass during consolidation and fiber drawing.

It is known conventionally to use germanium dioxide as a dopant in the core glass of an optical fiber preform, for the purpose of increasing the core refractive index—thereby facilitating the transmission of light through the ultimate optical fiber. During the process of consolidating the porous glass soot for the core, the chlorine used for drying has the side effect of reacting with germanium dioxide to produce germanium tetrachloride. Thus mobilized, the germanium in tetrachloride form can migrate outward from the core and redeposit as germanium dioxide.

In a small-sized preform, the migration of germanium tetrachloride outward throughout the light-carrying regions of the fiber preform due to reaction with the chlorine may be sufficient to provide enough germanium dioxide to control the excess oxygen which would otherwise be available for reaction with later-migrating hydrogen. However, this beneficial effect of the chlorine drying step depends on the diameter of the preform being dried and consolidated. The greater the preform diameter, the less effective the chlorine drying step will be in acting on available germanium dioxide in the core to spread it out into outer light carrying regions. As efficiencies of scale are achieved with drawing optical fiber of ever-increasing volume and hence increasing diameter, the need to directly address scavenging of excess oxygen through the light-carrying regions of the ultimate optical fiber accordingly becomes critical. We have found that in preforms having a diameter in excess of 105 millimeters (mm), the chlorine-induced migration of core-deposited germanium dioxide can be insufficient.

SUMMARY OF INVENTION

The conventional art has consistently taught against adding germanium dioxide other than to the core glass of an optical fiber preform. In multimode fiber, light travels solely in the core. It does so because the index of refraction of the core glass is designed to be higher than that of the cladding. Adding germanium dioxide to the cladding would inevitably raise the refractive index of the cladding, potentially destroying the light-carrying potential of the optical fiber. Single-mode optical fiber operates somewhat differently. By single-mode optical we mean an optical fiber as conventionally so designated, i.e., an optical fiber which propagates only the two mutually orthogonal modes of the HE11 mode of light, at a chosen signal wavelength. Again it is critical that the refractive index of the core be higher than that of the cladding. However, in this case the light travels in both the core and the cladding. The conventional teachings still point to avoiding the presence of germanium dioxide in the cladding, because that will tend to increase the refractive index of the cladding and ultimately destroy the light-carrying potential of the optical fiber.

However, we have now found that germanium dioxide can be added to the portion of the cladding of a single-mode optical fiber that is intended to carry light in small concentrations, which will act to scavenge otherwise labile excess oxygen in the glass to control the attenuation-increasing impact of later-migrating hydrogen on the optical fiber, while raising the refractive index of the glass to a degree insufficient to result in significant adverse impact on the single-mode light-carrying potential of the fiber.

More particularly, this invention provides a single-mode optical fiber comprising a central core, an inner cladding surrounding the core, and an outer cladding surrounding the inner cladding. The core is doped conventionally to raise its refractive index. The inner cladding and outer cladding may be made from essentially the same material, except that the inner cladding is doped with a small concentration of germanium dioxide. In preferred embodiments, the core dopant also comprises germanium dioxide. The concentration of germanium dioxide in the inner cladding broadly ranges from about 0.005 percent by weight to about 1 percent by weight; preferably about 0.1 to about 0.5 percent; and most preferably about 0.1 to about 0.3 percent. The invention also provides processes for making core and overclad preforms useful in making such optical fibers, and such core and overclad preforms.

DETAILED DESCRIPTION

Figure 1:
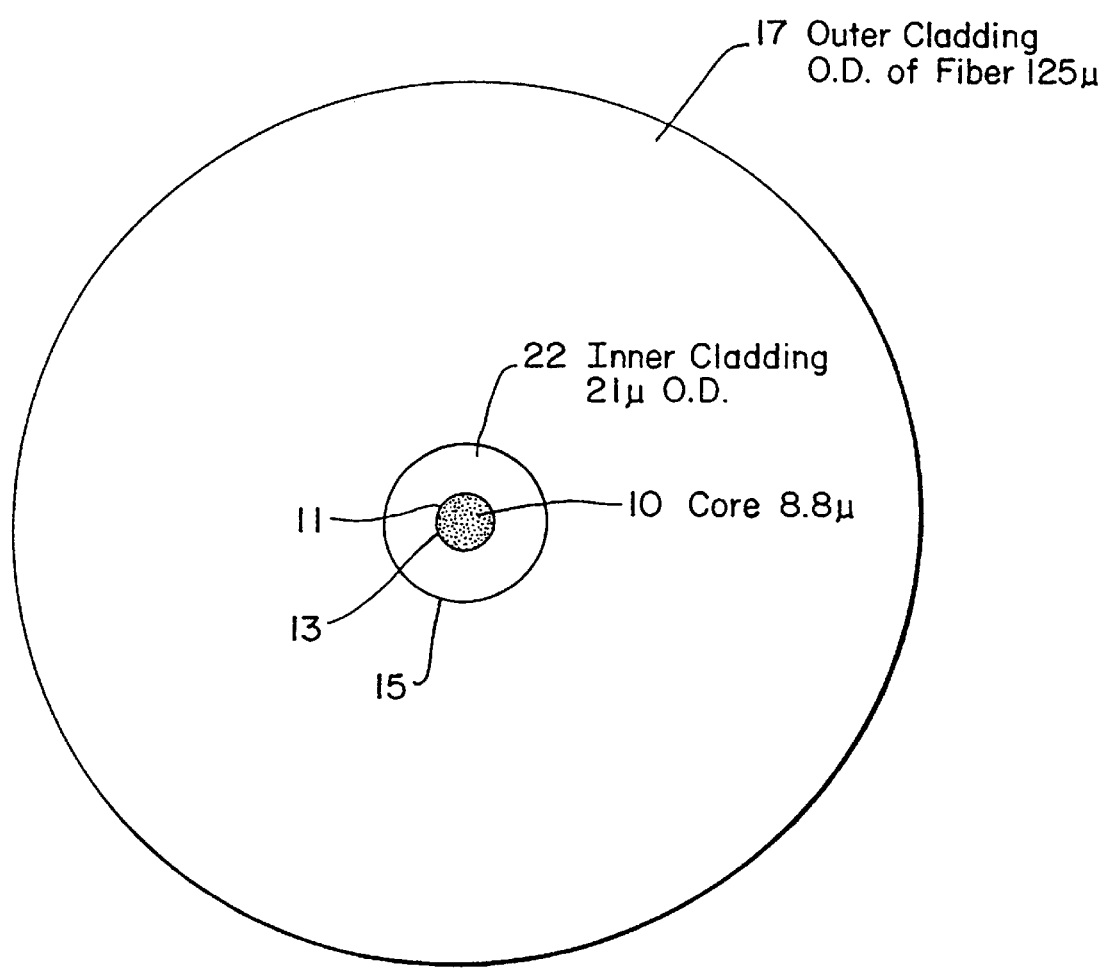
FIG. 1 is a cross-sectional view of an optical fiber made accordance with the invention.

In accordance with a known technique for forming single-mode optical fibers, a core cane comprising a fiber core region and an inner cladding region is initially formed. The core cane is overclad with additional cladding material to form a preform that is drawn into an optical fiber. As shown in FIG. 1, the optical fiber has a central core 10 that is defined by an outer surface 11. Inner cladding region 22, which forms an annulus around core 10, has an inner surface 13 formed on the outer surface 11 of core 10. Inner cladding region 22 also has an outer surface 15. Outer cladding region 17 surrounds region 22. In one commercial embodiment of a single-mode fiber of the above-described type, the diameter of the core 10 is approximately 8.8 microns, the radial thickness of the inner cladding region 22 is approximately 6.1 microns and the radial thickness of the outer cladding region 17 is approximately 52 microns.

The material of the inner cladding region 22 is normally pure silica. It is also known to add dopants to inner cladding region 22 that lower the index of refraction of the inner cladding region 22. By reducing the index of refraction of the inner cladding region 22, the difference between the indexes of refraction of the core 10 and the inner cladding region 22 are substantially increased. So, following conventional teachings, it is normally undesirable to raise the index of refraction of the inner cladding region 22.

Figure 2:
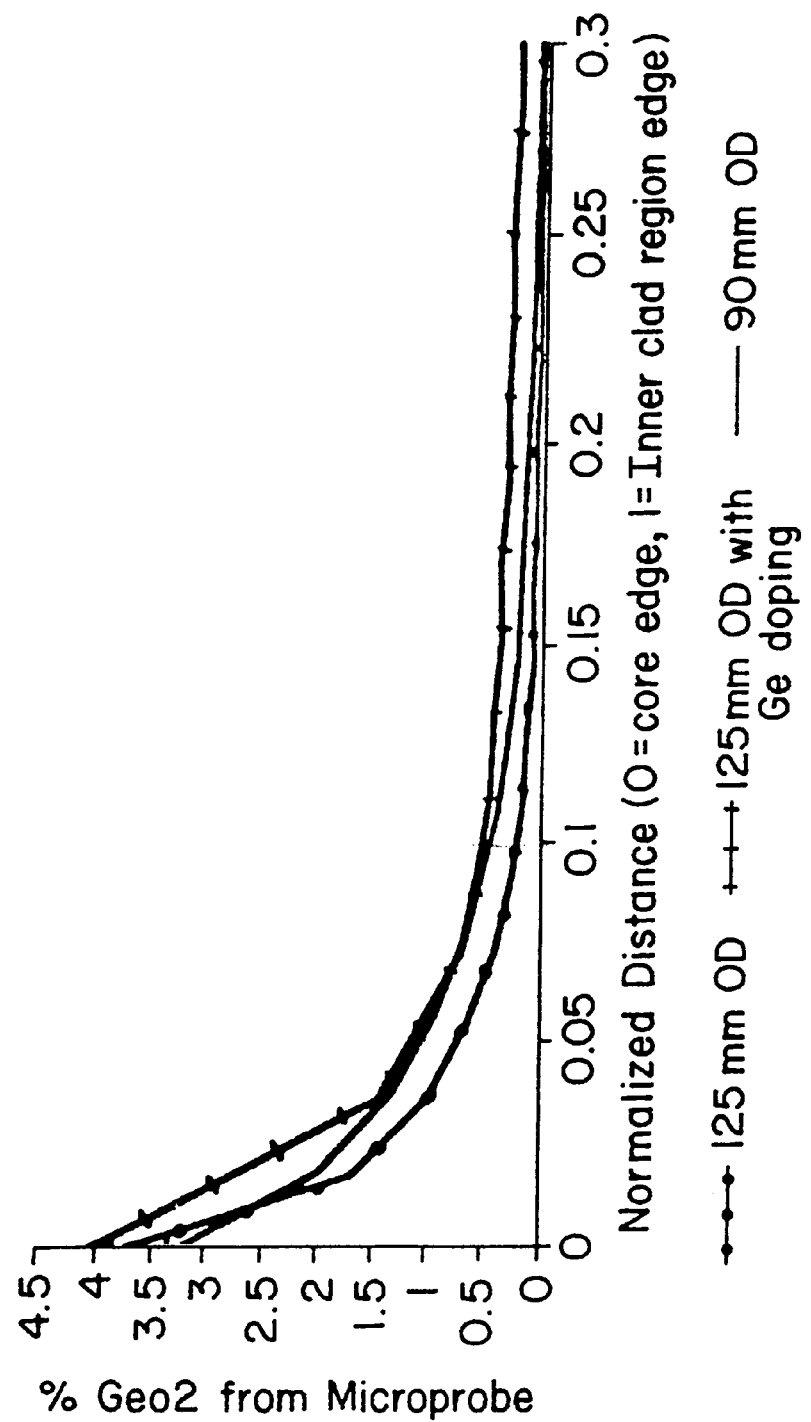
FIG. 2 is a graph showing the percentage concentration of germanium dioxide in the annular inner cladding of the optical fiber of FIG. 1.

Nevertheless, adding relatively small amounts of germanium dioxide to the inner cladding region 22 significantly reduces the later incidence of hydrogen-induced attenuation. The results of one experiment are shown in FIG. 2 (OD= Outer Diameter). There are shown the relative prepared amounts of germanium dioxide in the inner cladding annulus for a preform (including outer cladding) having an unconsolidated diameter of 90 millimeters without germanium dioxide doping in the inner cladding region, and a similar preform having an unconsolidated diameter of 125 millimeters with and without germanium dioxide doping in the inner cladding region. As expected, some of the germanium dioxide from the core diffused into the inner cladding region 22 in a region next to the interface 11–13 of the core 10 and the inner cladding region 22. However, the germanium dioxide concentration in the 90 mm blank and in the 125 mm blank decreased almost to zero at a distance of about 30% of the radius of the inner cladding region annulus 22 from the inner surface 13. The 125 mm blank with germanium dioxide doping in the inner cladding region maintained a level of germanium dioxide concentration at approximately 0.5% by weight in an annular region extending to the outer surface 15 of the inner cladding region. The portion of the inner cladding region near the core had higher concentrations of germanium dioxide, due to migration of germanium in tetrachloride form from the core to the inner cladding region during drying and consolidation.

The comparative results of FIG. 2 are shown in Table 1.

TABLE 1

| Process Description | Mean Hydrogen Induced Attenuation - [dB/km max @ 1530 nm](STD Deviation of Test Results) | Number of Core Preforms Tested | Number of Optical Fibers Tested |
| --- | --- | --- | --- |
| 90 mm OD - No GEO$_2$ deliberately doped In Inner Clad | 0.005 (0.003) | 30 | 30 |
| 125 mm OD - No GEO$_2$ deliberately doped In Inner Clad | 0.573 (0.081) | 7 | 16 |
| 125 mm OD + Ge doping - In Inner Clad | 0.030 (0.036) | 7 | 19 |

Further experiments have shown that the concentration of germanium dioxide in the inner cladding region of an optical fiber preform should be at least about 0.005 percent by weight; and that concentrations above about 1 percent by weight will lead to inordinate increases in the refractive index of the inner cladding region. Preferably, the germanium dioxide concentration in the inner cladding region ranges from about 0.1 to about 0.5 percent; and most preferably about 0.1 to about 0.3 percent. We define the boundary of the inner cladding region as being the outer limit of the portion of the ultimate optical fiber through which an appreciable portion of light directed through the end of the fiber is transmitted (thereby making reduction of hydrogen-induced attenuation of significance there).

These relatively small concentrations of germanium dioxide used in the inner cladding region do not have an undue effect upon the transmission of light within the core and inner cladding region.

We now describe preferred embodiments of processes for making core and fiber preforms as well as optical fibers. It is to be noted that the drawings are illustrative and symbolic of the invention, and there is no intention to indicate scale or relative proportions of the elements shown therein. Further, it is to be noted that the present invention expressly contemplates single-mode waveguides since the problem of hydrogen-induced attenuation does not occur in multimedia waveguides. The present invention also contemplates optical waveguides having cores with either a constant gradient or otherwise varied index of refraction.

Figure 3:
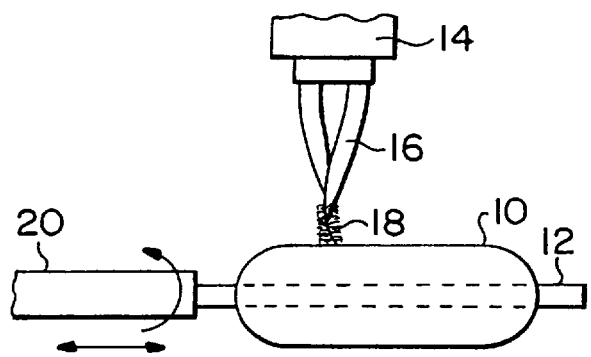
FIGS. 3 and 4 illustrate the application of the core and inner cladding regions of glass soot to a mandrel.
Figure 4:
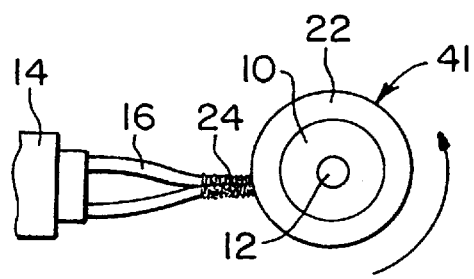

Optical waveguide soot preforms may be conventionally prepared e.g., in accordance with the methods illustrated in FIGS. 3 and 4. A coating 10 of glass soot is supplied to cylindrical mandrel 12 by means of flame hydrolysis burner 14. Fuel gas and oxygen or air are supplied to burner 14 from a source (not shown). This mixture is burned together with liquid precursors to the glass soot, such as silicon tetrachloride or a polyalkylsiloxane (e.g., octamethylcyclotetrasiloxane) to produce flame 16 which is emitted from the burner. A gas-vapor mixture of fuel gas, oxygen and soot precursors is oxidized with flame 16 to form a glass soot that leaves the flame in a stream 18, which is directed toward mandrel 12. The first soot of coating (many layers) deposited on mandrel 12 forms the core 10 of the optical fiber. The flame hydrolysis method of forming soot coatings on cylindrical mandrels is described in greater detail in U.S. Pat. Nos. Re 28,029 and 3,823,995. Mandrel 12 is supported by means of handle 20 and may be rotated and translated as indicated by arrows adjacent thereto in FIG. 3 for uniform deposition of soot.

A second coating of soot (many layers) is applied over the outside peripheral surface of first coating 10 as shown in FIG. 4. The second coating will form the inner cladding region 22. In accordance with well-known practice the refractive index of inner cladding region 22 is made lower than that of coating 10 (core region) by changing the composition of the soot 24 being produced in flame 16. This can be accomplished by changing the concentration or type of dopant material being introduced into the flame, or by omitting a dopant material. Mandrel 12 may again be rotated and translated to provide a uniform deposition of inner cladding region 22, the composite structure including first coating 10 (core region) and second cladding 22 constituting an optical waveguide soot core preform 41.

According to the invention, the process for application of the second coating of soot ultimately forming the inner cladding region 22, is modified from conventional teachings by the introduction of suitable concentrations of a germanium precursor (such as germanium tetrachloride) to yield the prescribed concentrations of germanium dioxide in the inner cladding region of the preform and the ultimate optical fiber. In preferred embodiments, the concentration of the germanium precursor in the soot precursor composition ranges from about 0.003 to about 0.6 mole percent, more preferably about 0.03 to about 0.3 mole percent, and most preferably, about 0.06 to about 0.2 mole percent. In another preferred embodiment, the composition of the inner cladding soot precursor composition is maintained constant during the deposition of the inner cladding region glass soot. We note here that although the above description has been provided to illustrate the process aside from the germanium addition to the inner cladding region is entirely conventional. Hence, modifications to the conventional process steps as known to those of ordinary skill in the art can be employed. For example, any of the various lay down processes can be used, including but not limited to outside vapor deposition, inside vapor deposition, vapor axial deposition, modified chemical vapor deposition, or plasma outside inside deposition.

In the manufacture of optical fibers, the materials of the core and cladding (inner and outer) regions of the optical fiber should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have higher index of refraction than the cladding for proper operation, the core glass may desirably be formed of the same type of glass used for the cladding and doped with a small amount of some other material to slightly increase the refractive index thereof. For example, if pure fused silica is used as the cladding glass, the core glass can consist of fused silica doped with a material to increase its refractive index. Precursors to silica can include, by way of examples: silicon tetrachloride, polyalkylsiloxanes such as hexamethylcyclotrisiloxane, and polyalkyicyclosiloxanes such as octamethylcyclotetrasiloxane, hexamethylcyclotrisiloxane and decamethylcyclopentasiloxane.

Many suitable materials have been used as dopants alone or in combination with each other to increase the refractive index of fused silica. These include, but are not limited to, titanium oxide, tantalum oxide, aluminum oxide, lanthanum oxide, phosphorus oxide and germanium dioxide. A core of germanium dioxide-doped fused silica is advantageously provided with a cladding layer of fused silica. Precursors to germanium dioxide can include germanium tetrachloride.

Figure 5:
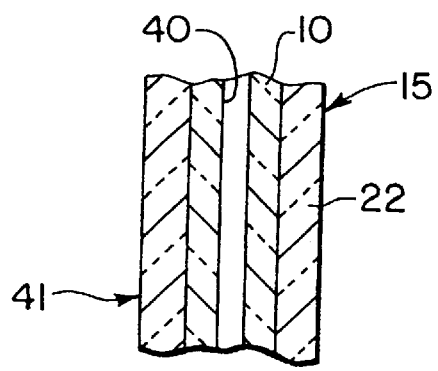
FIG. 5 is a cross-sectional view of a dense glass blank that is formed on the mandrel of FIGS. 3, 4;.

Removing the mandrel 12 results in a hollow, cylindrical porous soot core preform 41, such as that illustrated in FIG. 5. Preform 41 comprises first and second porous soot glass layers 10 and 22, respectively, the refractive index of layer 10 being greater than that of layer 22. It is also possible although less preferred, to draw core cane after depositing and consolidating core layer 10 only.

The core preform 41 is then consolidated, deposited with an overcladding to form the outer cladding region and consolidated again. The consolidation and overcladding steps are well known in the art but are briefly described for the sake of continuity. The preform 41 is a porous structure with a texture that resembles chalk. It is consolidated by heating it in a furnace in a controlled manner generally in the presence of chlorine and optionally helium to remove the pores. The chlorine is used to dry the preform; this may be performed prior to the consolidation step (preferred) or simultaneously. The consolidated core preform is then drawn to remove the center hole and produce core cane, and cut into suitable lengths for overcladding. Next the overcladding is applied by depositing soot on a suitable length of core cane. The overcladded preform is then consolidated to remove pores in the overcladding. Finally, the consolidated overcladded preform 81 is then drawn into an optical waveguide fiber.

Conventional optical waveguide fiber technology which, will be readily employed by those of ordinary skill in the art in practicing the invention, all of which is hereby incorporated herein by reference, includes by way of non-limiting examples the following.

As to raw materials useful as soot precursors, see: Dobbins U.S. Pat. No. 5,043,002; and Blackwell U.S. Pat. No. 5,152,819.

As to processes for the vaporization or nebulization of soot precursors, see: Antos U.S. Pat. No. 5,078,092; Cain U.S. Pat. No. 5,356,451; Blankenship U.S. Pat. No. 4,230,744; Blankenship U.S. Pat. No. 4,314,837; and Blankenship U.S. Pat. No. 4,173,305.

As to burning soot precursors and laydown of core and cladding, see: Abbott U.S. Pat. No. 5,116,400; Abbott U.S. Pat. No. 5,211,732; Berkey U.S. Pat. No. 4,486,212; Powers U.S. Pat. No. 4,568,370; Powers U.S. Pat. No. 4,639,079; Berkey U.S. Pat. No. 4,684,384; Powers U.S. Pat. No. 4,714,488; Powers U.S. Pat. No. 4,726,827; Schultz U.S. Pat. No. 4,230,472; and Sarkar U.S. Pat. No. 4,233,045.

As to the steps of core preform consolidation, core cane drawing, and overclad preform consolidation, see: Lane U.S. Pat. No. 4,906,267; Lane U.S. Pat. No. 4,906,268; Lane U.S. Pat. No. 4,950,319; Blankenship U.S. Pat. No. 4,251,251; Schultz U.S. Pat. No. 4,263,031; Bailey U.S. Pat. No. 4,286,978; Powers U.S. Pat. No. 4,125,388; Powers U.S. Pat. No. 4,165,223; and Abbott U.S. Pat. No. 5,396,323.

As to fiber drawing from a consolidated overclad preform, see: Harvey U.S. Pat. No. 5,284,499; Koening U.S. Pat. No. 5,314,517; Amos U.S. Pat. No. 5,366,527; Brown U.S. Pat. No. 4,500,043, Darcangelo U.S. Pat. No. 4,514,205; Kar U.S. Pat. No. 4,531,959; Lane U.S. Pat. No. 4,741,748; Deneka U.S. Pat. No. 4,792,347; Ohls U.S. Pat. No. 4,246,299; Claypoole U.S. Pat. No. 4,264,649; and Brundage U.S. Pat. No. 5,410,567.

We claim:

1. In a process for fabricating a core preform having utility in making single-mode optical waveguide fibers, comprising reacting a core soot precursor composition and depositing central core region glass soot on a substrate, and then reacting an inner cladding soot precursor composition and depositing inner cladding region glass soot over said central core region glass soot to yield said core preform, the improvement comprising including in said inner cladding soot precursor composition, a precursor to germanium dioxide at a concentration within the range of about 0.03 to about 0.3 mole percent, effective to yield inner cladding region glass soot comprising between about 0.1 percent by weight to 0.4 percent by weight of germanium dioxide beyond a 0.1 normalized radial distance from an outer edge of a core of the optical fiber.

2. A process of claim 1, in which the composition of the inner cladding soot precursor composition is maintained constant during the deposition of inner cladding region glass soot.

3. A process according to claim 1, in which said inner cladding soot precursor composition comprises a precursor to germanium dioxide at a concentration within the range of about 0.06 to 0.2 mole percent, effective to yield inner cladding region glass soot comprising between about 0.1 percent by weight to about 0.3 percent by weight of germanium dioxide.

4. A process according to claim 1, in which said inner cladding soot precursor composition essentially comprises a precursor to silicon dioxide and a precursor to germanium dioxide.

5. A process according to claim 1, in which the precursor to germanium dioxide is germanium tetrachloride.

6. A process according to claim 4, in which the precursor to germanium dioxide is germanium tetrachloride.

7. A process according to claim 4, in which the precursor to silicon dioxide is selected from the group consisting of silicon tetrachloride, hexamethylcyclotrisiloxane, hexamethylcyclotrisiloxane, octamethylcyclotetrasiloxane, and decamethylcyclopentasiloxane.

8. A process according to claim 1, in which said core soot precursor composition comprises a precursor to germanium dioxide.

9. A process according to claim 1, in which the concentration of said precursor to germanium dioxide in the inner cladding soot precursor composition is maintained essentially constant throughout the step of depositing inner cladding region glass soot over said central core region glass soot.

10. In a process for fabricating an overclad preform having utility in making single-mode optical waveguide fibers, comprising (a) reacting a core soot precursor composition and depositing central core region glass soot on a substrate, then (b) reacting an inner cladding soot precursor composition and depositing inner cladding region glass soot over said central core region glass soot to yield a core preform, then (c) drying the core preform in the presence of chlorine and consolidating it at high temperature, then (d) heating said core preform and drawing core cane therefrom, then (e) reacting an outer cladding soot precursor composition and depositing outer cladding region glass soot over a length of said core cane to yield said overclad preform, the improvement comprising including in said inner cladding soot precursor composition, a precursor to germanium dioxide at a concentration within the range of about 0.03 to about 0.3 mole percent, effective to yield inner cladding region glass soot comprising between about 0.1 percent by weight to 0.4 percent by weight of germanium dioxide beyond a 0.1 normalized radial distance from an outer edge of a core of the optical fiber.

11. In a process for fabricating a single-mode optical waveguide fiber, comprising (a) reacting a core soot precursor composition and depositing central core region glass soot on a substrate, then (b) reacting an inner cladding soot precursor composition and depositing inner cladding region glass soot over said central care region glass soot to yield a core preform, then (c) drying the core preform in the presence of chlorine and consolidating it at high temperature, then (d) heating said core preform and drawing core cane therefrom, then (e) reacting an outer cladding soot precursor composition and depositing outer cladding region glass soot over a length of said core cane to yield said overclad preform, then (f) consolidating the overclad preform in the presence of chlorine, then (g) heating said overclad preform and drawing waveguide fiber therefrom, the improvement comprising including in said inner cladding soot precursor composition, a precursor to germanium dioxide at a concentration within the range of about 0.03 to 0.3 mole percent, effective to yield inner cladding region glass soot comprising between about 0.1 percent by weight to 0.5 percent by weight of germanium dioxide beyond a 0.1 normalized radial distance from an outer edge of a core of the optical fiber.

12. A process according to claim 1 wherein said normalized distance radial distance is beyond 0.2.

13. A process according to claim 1 wherein said normalized radial distance is beyond 0.25.

* * * * *